United States Patent Office 2,841,523

Patented July 1, 1958

2,841,523

PHENYL HYDRAZONES OF THIENYL PHENYL KETONES

Van R. Gaertner, Dayton, Ohio, assignor to Monsanto Chemical Company, St. Louis, Mo., a corporation of Delaware No Drawing. Application September 21, 1954
Serial No. 457,556

10 Claims. (Cl. 167—33)

The present invention relates to heterocyclic compounds of sulfur and more particularly provides certain new and valuable thiophene derivatives, methods of preparing the same, and biological toxicants, particularly cereal plant rust eradicant compositions comprising said derivatives as the essential effective ingredients.

According to the invention there are provided certain N-hydrocarbon-substituted hydrazones of thienyl phenyl ketones, said hydrazones having the formula

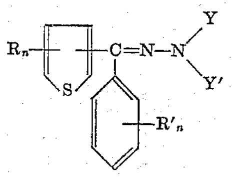

in which R and R′ are selected from the class consisting of hydrogen and alkyl radicals of from 1 to 5 carbon atoms, Y and Y′ are hydrocarbon radicals free of non-benzenoid unsaturation and containing from 1 to 12 carbon atoms, and $n$ is a number of from 1 to 2.

The present phenylhydrazones are readily prepared by contacting a thienyl phenyl ketone, which may have up to two alkyl radicals substituted in the thiophene and/or the benzene ring with an appropriate hydrocarbon hydrazine. Examples of the thienyl phenyl ketone hydrazones provided by the present invention and having the formula shown above are 2-thienyl phenyl ketone phenylhydrazone, 2-thienyl phenyl ketone 1-tert-amyl-1-phenylhydrazone, 2-thienyl-4-tolyl ketone 1-naphthylhydrazone, 2-thienyl 4-tolyl ketone 4-tolylhydrazone, 5-isopropyl-2-thienyl phenyl ketone benzylhydrazone, 3-, 4- or 5-methyl-2-thienyl phenyl ketone phenylhydrazone, 2,5-dimethyl-3-thienyl phenyl ketone phenylhydrazone, 2-thienyl 4-xylyl ketone, 4-biphenylylhydrazone, 2-thienyl phenyl ketone 1-n-dodecyl-1-phenylhydrazone, 2-thienyl 4-tolyl ketone 1,1-diphenylhydrazone, etc.

In preparing the present N-hydrocarbon hydrazones the thienyl phenyl ketone or an appropriate alkyl derivative thereof is mixed with the hydrocarbon hydrazine in the presence or absence of an inert solvent or diluent and/or an organic acid compound as catalyst, and the whole is maintained at ordinary or increased temperature until formation of the hydrazone has been completed. In some instances, particularly when working with the more sluggish higher alkylhydrazones or when assurance of complete reaction is desired, it may be advisable to heat the reaction mixture. Temperatures of up to the refluxing temperature of the reaction mixture may be used; higher temperatures, while permissible, serve no purpose in accelerating the generally very ready condensation. Since formation of the hydrazones proceeds with condensation of one mole of the N-hydrocarbon hydrazine with one mole of the ketone, these reactants are used advantageously in substantially equimolar proportions. Since the hydrazone products are insoluble in water, the use of equimolar proportions of the hydrazine compound and the ketone eliminates any otherwise tedious isolating procedures, particularly when no solvent or diluent is employed. However, any excess over the stoichiometric proportions of either reactant may be used, particularly if it is desired to assure complete participation of a difficultly available reactant. The excess of hydrazine compound or of the thienyl phenyl ketone may be readily removed from the reaction mixture by known isolating procedures, e. g., by fractional distillation, crystallization or solvent extraction.

When working with the highly reactive hydrocarbon hydrazines or thiophene ketones, it is generally desirable to operate in the presence of an inert solvent or diluent in order to obtain smooth reaction. Such solvents or diluents may be non-carbonylic liquids such as water, the paraffinic alcohols, ethers, or hydrocarbons, aromatic compounds such as benzene, xylene, nitrobenzene, or chlorobenzene. For easy manipulation, it is recommended that the diluent employed be one in which at least one of the reactants is soluble.

The condensation reaction may be accelerated, if desired, by the use of an organic acid as catalyst. Acids such as acetic, butyric, benzoic or 4-toluenesulfonic acid may be used for this purpose in catalytic quantities, say, in amounts of from 0.1% to 2.0% by weight of the reactants.

The present N-hydrocarbon hydrazones are stable compounds which range from oils to waxy or crystalline solids. They are particularly valuable as biological toxicants, e. g., as insecticides, nematocides and fungicides. In the field of agricultural fungicides they are outstanding in their ability to suppress growth of wheat rust without injuring the wheat. The hydrazones herein defined are also efficient for preventing and retarding fungus growth on plants, fruits, seeds, soils, fur, leather, cotton, wool and organic materials in general. They may be applied directly to the organic material which is to be treated, but because the present hydrazones are effective in extremely dilute concentrations, it is preferred to incorporate them with a carrier or diluent.

Fungicidal dusts may be prepared by mixing the hydrazones with dusting materials such as talc, clay, lime, bentonite, pumice, fuller's earth, etc. The hydrazones may be dissolved in organic solvents therefor and the resulting solutions used as fungicidal or fungi-preventing sprays. More expediently a small amount of concentrated solution of the hydrazone in an organic solvent, e. g., cyclohexanone, may be added to water in the presence of an emulsifying agent to form an emulsion and the oil-in-water emulsion thus obtained is employed as a spray. Suspensions or dispersions of the hydrazone in a solvent such as water are advantageously employed in the treatment of such plant foliage, textiles, leather or other material with which it is not desirable to employ either a solid carrier or an organic solvent.

Fungicidal compositions comprising the present hydrazones may be applied only to the surface of the material to be treated as when treating foliage, fur, leather and other comparable impregnable materials upon which fungus growth is to be prevented or retarded. In other cases, for example when it is desired to protect seeds from soil microorganisms harmful to the seeds and plants, the hydrazone, preferably incorporated with solid carriers, may be simply mixed with the seed for protection of fruits, seeds, plant tubers, etc. during storage; it may be advantageous to effect the treatment by employing baths comprising aqueous emulsions of the fungicides. Impregnation of textiles with the fungicide is also advantageously effected in baths.

As already stated, the present hydrazones are particularly valuable in the control of cereal rusts, whereby they function as plant chemotherapeutants against the various leaf and stem rusts of wheat, barley, rye, and oats and other small grain crop plants. Such cereal rusts as the stem rust *Puccinia graminis tritici* or the leaf rust *P. rubigo-vera tritici* or the stripe rust *P. glumarum* of wheat usually cannot be controlled by general purpose fungicides. The stem and crown rusts of oats (*P. graminis avenae* and *P. coronata avenae*), as well as the stem rust of rye (*P. graminis secalis*) or the leaf rust (*P. hordei*) of barley display similar resistance.

In prior art, much effort has been expended in the past in breeding rust-resistant strains of these cereals; but as new strains of, e. g., wheat, are developed, new races of the above classes of rusts appear and proceed to attack the new, presumably rust-resistant strains of wheat. The history of breeding for rust resistance thus comprises a recurrent introduction of cereal strains which are resistant to prevailing races of the rusts and subsequent appearance of new races of rusts to which the recently introduced cereal strains are susceptible. Accordingly, the eradication of fungus growth by chemical treatment of cereal plants has become subjected to close scrutiny. Unfortunately most of the known fungicides have been found to be unsuitable either because they do not prevent or destroy rust growth at non-phytotoxic concentrations or because their physical and chemical nature prevents a commercially expedient means of application. Particularly when aerial dusting or spraying is the contemplated means of application, particle size and solubility are of extreme importance.

The invention is further illustrated, but not limited, by the following examples:

*Example 1*

2-thienyl phenyl ketone (18.8 g., 0.1 mole) was dissolved in 50 ml. of alcohol by heating to reflux. After some cooling of the solution there was added to it about 5 ml. of acetic acid, and then 10.8 g. (0.1 mole) of phenylhydrazine was introduced dropwise. When the resulting exothermic reaction had subsided, the reaction mixture was heated briefly to boiling. The whole was allowed to remain at room temperature and dried by evacuation. The dried, viscous oil thus obtained comprised the substantially pure 2-thienyl phenyl ketone phenylhydrazone.

*Example 2*

The therapeutic effect on wheat of the 2-thienyl phenyl ketone phenylhydrazone of Example 1 was determined as follows:

Five uniform, six-day old seedlings of a rust-susceptible variety of wheat (Seneca) were sprayed with water by means of an atomizer. The individual leaves were then gently rubbed between the thumb and index finger to remove the "bloom," and then inoculated with *Puccinia rubigo-vera tritici* by gently scraping, up and down the back sides of the rubbed leaves, a scalpel which had been water-wetted and loaded with spores of the organism. Following inoculation, the plants were sprayed with a fine mist of water and maintained for 48 hours in an incubation chamber at a temperature of 70° F. and a humidity of 100%. They were then transferred to greenhouse benches where they were kept for another 48 hours. At the end of that time they were sprayed with an emulsion prepared as follows:

The phenylhydrazone (100 mg.) was added to 5 ml. of acetone, and there was then introduced to the resulting solution approximately 0.1 ml. of an emulsifying agent known to the trade as "Tween 20" and reputed to be a polyoxyethylene sorbitan monolaurate. The whole was then diluted with 5 ml. of water to give an emulsion containing 1% by weight of the hydrazone. For the instant test the 1% emulsion was further diluted with water to give an emulsion containing 0.5% by weight of the phenylhydrazone.

Spraying of the plants with the emulsions was effected by means of an atomizer, 5 ml. of the emulsion being used per pot of 5 plants. The sprayed plants were then returned to the greenhouse and held there for a week. Observation of the plants at the end of that time disclosed that development of rust on plants which had been sprayed with the emulsion of 2-thienyl phenyl ketone phenylhydrazone had been suppressed, and there was no evidence of phytotoxic effect. Similarly inoculated but unsprayed plants which had been maintained in the incubator and greenhouse for the same length of time were found to be badly affected by the rust.

What I claim is:

1. A compound having the formula

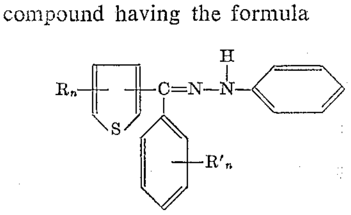

in which R and R' are selected from the class consisting of hydrogen and alkyl radicals of from 1 to 5 carbon atoms and *n* is a number of from 1 to 2.

2. The phenylhydrazone of thienyl phenyl ketone.

3. 2-thienyl phenyl ketone phenylhydrazone.

4. A biological toxicant comprising an inert carrier and as the essential active ingredient a compound having the formula

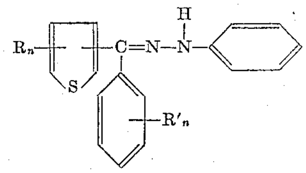

in which R and R' are selected from the class consisting of hydrogen and alkyl radicals of from 1 to 5 carbon atoms and *n* is a number of from 1 to 2.

5. A wheat rust eradicant composition comprising an inert carrier and as the essential active ingredient a rust-inhibiting quantity of a compound having the formula

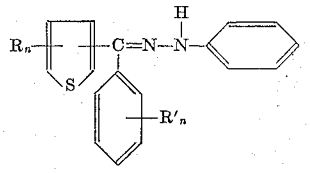

in which R and R' are selected from the class consisting of hydrogen and alkyl radicals of from 1 to 5 carbon atoms and *n* is a number of from 1 to 2.

6. A wheat rust eradicant composition comprising an oil-in-water emulsion of a rust-inhibiting quantity of thienyl phenyl ketone phenylhydrazone.

7. A wheat rust eradicant composition comprising an oil-in-water emulsion of 2-thienyl phenyl ketone phenylhydrazone.

8. The method of inhibiting the development of rust on wheat which comprises applying to the wheat a rust-inhibiting quantity of a wheat rust eradicant composition comprising as the essential active ingredient a compound having the formula

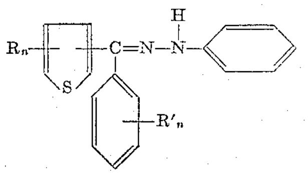

in which R and R' are selected from the class consisting of hydrogen and alkyl radicals of from 1 to 5 carbon atoms and *n* is a number of from 1 to 2.

9. The method of inhibiting the development of rust on wheat which comprises applying to the wheat a rust-inhibiting quantity of a wheat rust eradicant composition comprising thienyl phenyl ketone phenylhydrazone as the essential active ingredient.

10. The method of inhibiting the development of rust on wheat which comprises applying to the wheat a rust-inhibiting quantity of a wheat rust eradicant composition comprising 2-thienyl phenyl ketone phenylhydrazone as the essential active ingredient.

References Cited in the file of this patent

UNITED STATES PATENTS 2,606,166 Patrick ---------------- Aug. 5, 1952

OTHER REFERENCES

Szmant et al.: J. A. C. S. 74: 2725 (C. A. 46: 9396d).